United States Patent Office 2,985,601
Patented May 23, 1961

2,985,601

DEHYDRATION OF PENTAERYTHRITOL ESTERS AND PREPARATION OF RESINS FROM SAID DEHYDRATED ESTERS

William M. Kraft, Verona, N.J., assignor to Heyden Newport Chemical Corporation, a corporation of Delaware No Drawing. Filed Aug. 22, 1955, Ser. No. 529,921

10 Claims. (Cl. 260—22)

The present invention relates to the production of pentaerythritol reaction products including pentaerythritol alkyd resins having unexpected and highly desirable characteristics. While the present invention will be described more particularly in connection with the production of alkyd resins, its principles are applicable to the production of pentaerythritol reaction products which in addition to being useful in the production of alkyd resins are useful in preparing drying oils, paints and other products.

Alkyd resins are produced by reacting a polyhydric alcohol and a polycarboxylic acid. The polycarboxylic acid may be an aliphatic acid, for example, maleic acid, fumaric acid, succinic acid, sebasic acid and adipic acid, or an aromatic acid, for example, phthalic acid, terephthalic acid and isophthalic acid, or a non-aromatic acid, for example, tetrahydrophthalic acid and hexahydrophthalic acid. Mixtures of such acids can be used and the anhydrides of the acids can be used with the same results. For the sake of brevity, the term "acid" when in connection with polycarboxylic acids shall include the anhydride. Phthalic acid and phthalic anhydride, for example, can be used interchangeably. The polyhydric alcohol may be for example, glycerin, glycol, propylene glycol, diethylene glycol, pentaerythritol, dipentaerythritol, mannitol or mixtures thereof. The particular acid or combination of acids as well as the particular polyhydric alcohol or combination of alcohols depends on the characteristics desired in the alkyd resin.

Highly satisfactory alkyd resins which are especially useful in preparing architectural finishes are the pentaerythritol and dipentaerythritol types of alkyds. The alkyd resins prepared with dipentaerythritol are, in general, superior to those prepared from pentaerythritol. For example, dipentaerythritol-phthalic acid resins form films which are harder and more resistant to water and alkali than similar films formed from pentaerythritol-phthalic acid resins. However, dipentaerythritol is produced commercially only as a by-product in the production of pentaerythritol. When acetaldehyde and formaldehyde are condensed in an aqueous medium containing an alkaline condensation catalyst to produce pentaerythritol commercially, a relatively small amount of the polyhydric product, for example, about 12%, is dipentaerythritol. This limits the production of dipentaerythritol and it is not always available for use either alone or with pentaerythritol to form alkyd resins.

It has been discovered that pentaerythritol partially esterified with a monocarboxylic acid can be dehydrated in the presence of a dehydration catalyst to form a reaction product which upon reaction with a dicarboxylic acid, forms an alkyd resin having properties similar to those of alkyd resins obtained by reacting dipentaerythritol and the same acids. In other words, the partially esterified pentaerythritol can be dehydrated to form a product which is similar in properties to dipentaerythritol having the same degree of esterification. The esterification reaction may precede dehydration or take place substantially simultaneously therewith. Apparently, the ester groups direct or favor the formation of dipentaerythritol-like esters which are monoethers containing the ether linkage —CH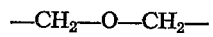—

Any of the monocarboxylic acids commonly used in the production of alkyd resins may be used for present purposes. The monocarboxylic acid may be an aliphatic or aromatic acid, for example, a higher fatty acid containing 6–18 carbon atoms, benzoic acid, or mixtures thereof. The acids of drying and semi-drying oils may be used as well as lauric and caproic acids. The degree of esterification may range from 1 to 3 moles of monocarboxylic acid per mole of pentaerythritol. About one mole of acid is required to obtain the desired results while esterification by more than 3 moles of acid unduly reduces the hydroxyl content and the formation of ether linkages upon dehydration. Preferably, the pentaerythritol is esterified with about 1 to 2 moles of acid per mole of pentaerythritol and very good results have been obtained with a ratio of about 1.3 moles of acid per mole of pentaerythritol. The degree of esterification is expressed as moles of acid per mole of pentaerythritol, it being understood that this is the average esterification. The following reaction illustrates the esterification reaction which accompanies or precedes the dehydration reaction:

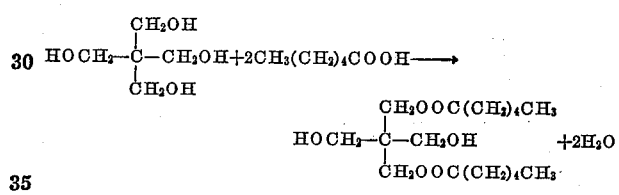

The properties of the pentaerythritol reaction product as well as the properties of the alkyd resins, or other products produced therefrom, depend on the amount of water removed as a result of dehydration. The removal of at least 0.4 mole of water per mole of pentaerythritol is desirable to obtain a noticeable improvement of the type customarily associated with the use of dipentaerythritol. If more than 0.8 mole of water per mole of pentaerythritol is removed by dehydration, the reaction proceeds very slowly and there is a tendency to produce insoluble by-products, which may be higher pentaerythritol ether-esters. Preferably, 0.45–0.65 mole of water is removed by dehydration. Indications are that the present pentaerythritol ester contains at least 10% to 30% of the dipentaerythritol ester. Dehydration of one mole of pentaerythritol ester to form a half mole of dipentaerythritol ester would require theoretically the removal of 0.5 mole of water in accordance with the following reaction:

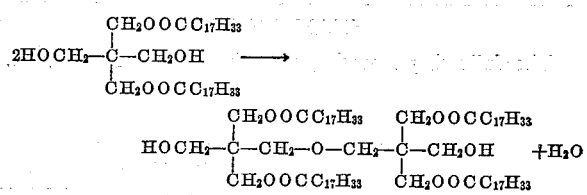

Representatives of the dehydration catalysts are the phosphorus and sulfur containing acids, phosphoric acid, pyrophosphoric acid and p-toluene sulfonic acid. These catalysts have been used in amounts ranging from 1.0–2.5% by weight based on the pentaerythritol content. Larger or smaller amounts of these and other dehydration catalysts may be used. Heating is desirable to effect more rapidly the esterification and dehydration reaction.

The following examples illustrate the present invention. All parts and percentages are by weight.

EXAMPLE I

One mole (146 grams) of technical pentaerythritol containing about 12% dipentaerythritol was mixed with 1.3 moles (370 grams) of soybean oil fatty acids and 2 grams of phosphoric acid. The mixture was heated at 220° C. until a total of 1.75 moles of water had been removed. The removed water was formed as a result of esterification and dehydration. The esterification reaction produced 1.3 moles of water and the dehydration reaction produced 0.45 mole of water. This esterified and dehydrated pentaerythritol reaction product was mixed with 0.28 mole (80 grams) of soybean oil fatty acids and 1.0 mole (148 grams) of phthalic anhydride. This mixture was heated at 230° C. until its acid number was less than 10. The properties of this alkyd resin are listed in the table included in Example II.

EXAMPLE II

In this example, a series of alkyds were made. In each instance, 1.3 moles (370 grams) of soybean oil fatty acids and 1 mole (146 grams) of technical pentaerythritol were heated at 220° C. with 2 grams of phosphoric acid. Three esterified reaction products were made in this manner by removing, 1.85, 1.95 and 2.05 moles of water, respectively. The water formed as a result of esterification was 1.3 moles. Then each dehydrated ester was reacted with 0.81 mole (120 grams) of phthalic anhydride to form an alkyd resin. The properties of these three resins are set forth in the following table. For purposes of comparison the properties of pentaerythritol and dipentaerythritol alkyd resins prepared with the same phthalate content are also given in this table. In each instance, a thin film of the alkyd resin was formed by casting onto a test tube a xylol solution containing 70% by weight of the alkyd resin. The film was air dried for 72 hours. Thereafter the coated test tube was immersed in 3% aqueous sodium hydroxide to determine the alkali resistance of the coating. A similar solution was cast in a film on flat glass to determine drying time and film hardness. The viscosity and color tests also were made with a xylol solution containing 70% of alkyd resin.

EXAMPLE III

The following materials were heated at 150–160° C. for 11 hours to form a partially esterified pentaerythritol ether:

| | |
|---|---|
| Mono pentaerythritol | 136 grams (1 mole). |
| Benzoic acid | 122 grams (1 mole). |
| p-Toluene sulfonic acid | 1.14 grams. |
| Xylol | 50 ml. |

The xylol-water azeotrope was collected and 26 ml. of water was obtained in this matter. Theoretically, the esterification reaction produces 18 ml. of water so that 8 ml. of water was formed as a result of dehydration. Dehydration of pentaerythritol to form the pentaerythritol ether, dipentaerythritol, should in theory produce 9 ml. of water.

The partially esterified pentaerythritol ether was further esterified with 244 grams (2 moles) of benzoic acid by heating for 28 hours at 196–215° C. The syrupy product was cooled and benzene was added to permit separation of a white crystalline material. The crystalline material was separated by filtration and this 56.5 grams of material had a melting point of 154–168° C. On recrystallization from benzene, 50.5 grams of a product was obtained having a melting point of 183–184° C. which is the melting point of dipentaerythritol hexabenzoate. Dipentaerythritol hexabenzoate from another source was mixed with the dipentaerythritol hexabenzoate produced in this manner without depressing the melting point.

The partially esterified pentaerythritol ether may be reacted with dibasic acid, for example, phthalic acid, to form an alkyd resin. This same intermediate product may be mixed with, for example, drying oil, to form a modified drying oil or may be used as such in architectural coatings.

EXAMPLE IV

Three different reaction products were prepared by esterifying pentaerythritol with various amounts of caproic acid. Xylol was added initially and the xylol and water were removed during esterification. The partially esterified pentaerythritol was then dehydrated by heating with a dehydration catalyst. The amounts of reactants, the reaction conditions and characteristics of the reaction products are set forth for the three runs in the accompanying table.

*Table*

| Example No. | Mole of H₂O of Dehydration per Mole Pentaerythritol | Gardner-Holdt Viscosity of Xylol Solution | Gardner (1933) Color of Xylol Solution | Drying Time, Minutes | | Sward Hardness (Glass—100) | | | Alkali Resistance, Minutes | | |
|---|---|---|---|---|---|---|---|---|---|---|---|
| | | | | Set to Touch | Tack Free | 1 Day | 7 Days | 14 Days | First Whitening | Considerable Attack | Complete Failure |
| I | 0.45 | Z-1 | 8 | 13 | 78 | 6 | 20 | 28 | 10 | 120 | 3,600 |
| IIa | 0.55 | F | 8 | 47 | 138 | 4 | 10 | 18 | 5 | 15 | 1,200 |
| IIb | 0.65 | Z-2 | 8 | 15 | 90 | 4 | 10 | 28 | 15 | 260 | 2,000 |
| IIc | 0.75 | Z-3 | 8 | 10 | 40 | 4 | 10 | 22 | 15 | 138 | 5,100 |
| Pentaerythritol Alkyd | none | E | 6½ | 90 | 150 | 4 | 6 | | 5 | 15 | 20 |
| Dipentaerythritol Alkyd | none | Y | 7 | 5 | 130 | 6 | 8 | | 15 | 150 | 270 |

| | No. 1 | No. 2 | No. 3 |
|---|---|---|---|
| Caproic Acid (commercial) | 119 g. (1 mole) | 238 g. (2 moles) | 357 g. (3 moles). |
| Pentaerythritol (pure) | 136 g. (1 mole) | 136 g. (1 mole) | 136 g. (1 mole). |
| Temp. during esterification | 170–209° C | 183–230° C | 180–225°C. |
| Heating period (hours) | 4.75 | 4.75 | 4.75. |
| H₂O removed | 18 g | 36 g | 54 g. |
| Esterified pentaerythritol: | | | |
| Percent OH—Found | 20.7 | 10.2 | 4.94. |
| Percent OH—Calc | 21.8 | 10.3 | 3.96. |
| Acid No.—Found | 1.5 | 4.8 | 8.3. |
| Toluene sulfonic acid added | 1.2 g | 1.8 g | 2.4 g. |
| Mixture heated at | 187–200° C | 202–214° C | 210–230° C. |
| Heating period (hours) | 2.5 | 16.5 | 19.5. |
| Dehydrated product: | | | |
| Percent OH—Found | 11.7 | 5.63 | 2.47. |
| Acid No.—Found | 1.4 | 1.3 | 1.5. |
| Water removed by dehydration | 9 ml. (0.5 mole) | 9 ml. (0.5 mole) | 7 ml. (0.39 mole). |

These esterified pentaerythritol ethers may be used in preparing alkyd resins. However, this type of product which is not esterified with siccative oil acids, is preferably used for other purposes and, for example, it may be reacted with a drying oil to form a modified drying oil which may be used in paints.

In the foregoing Examples I and II, the esterified pentaerythritol ether used in producing the alkyd resins, was only partially esterified and contained reactive hydroxyl groups. While partial esterification is preferable so that the esterification plus dehydration does not account for all the hydroxyl groups, this reaction product need not contain hydroxyl groups. A pentaerythritol ether may be completely esterified. In other words the esterification and dehydration reactions may account for substantially all of the hydroxyl groups. Such a product, for example the dipentaerythritol hexabenzoate of Example III may be subjected to alcoholysis with a polyhydric alcohol and this reaction product can then be reacted with a polycarboxylic acid to form an alkyd resin. Alternatively, such a completely esterified pentaerythritol ether can be used in coatings, such as varnishes, lacquers and paints.

The dicarboxylic acid or anhydride reacted with the esterified pentaerythritol ether may be any of the dicarboxylic acids or their anhydrides used in the production of alkyds. The reaction of the dicarboxylic acid with the dehydrated pentaerythritol ester may follow alcoholysis of the dehydrated pentaerythritol ester. If the dehydrated pentaerythritol ester is only partially esterified this reaction product may be further esterified with monocarboxylic acid before reaction with the dicarboxylic acid or may be reacted directly with dicarboxylic acid to form an alkyd resin.

I claim:

1. The method of producing pentaerythritol reaction products which comprises the steps of heating and esterifying pentaerythritol with 1 to 2 moles per mole of pentaerythritol of a monocarboxylic acid selected from the group consisting of fatty acids containing 6 to 18 carbon atoms, benzoic acid, and mixtures thereof at a temperature between approximately 150° C. and 230° C. to remove 1 mole of water of esterification per mole of acid and heating and dehydrating the partially esterified pentaerythritol at a temperature between approximately 150° C. and 230° C. in the presence of an acid dehydration catalyst to remove from 0.4 to 0.8 mole of water of dehydration per mole of pentaerythritol thereby forming a partially esterified dipentaerythritol-containing pentaerythritol reaction product.

2. The method of producing pentaerythritol reaction products which comprises the steps of heating and esterifying pentaerythritol with 1 to 2 moles per mole of pentaerythritol of a monocarboxylic acid selected from the group consisting of fatty acids containing 6 to 18 carbon atoms, benzoic acid, and mixtures thereof at a temperature between approximately 150° C. and 230° C. to remove 1 mole of water of esterification per mole of acid and heating and dehydrating the partially esterified pentaerythritol at a temperature between approximately 150° C. and 230° C. in the presence of an acid dehydration catalyst to remove from 0.45 to 0.65 mole of water of dehydration per mole of pentaerythritol thereby forming a partially esterified dipentaerythritol-containing pentaerythritol reaction product.

3. The method of producing pentaerythritol reaction products which comprises the steps of forming a mixture comprising pentaerythritol, an acid dehydration catalyst, and from 1 to 2 moles of a monocarboxylic acid per mole of pentaerythritol, said monocarboxylic acid being selected from the group consisting of fatty acids containing 6 to 18 carbon atoms, benzoic acid, and mixtures thereof, and heating said mixture at a temperature between approximately 150° C. and 230° C. to substantially simultaneously esterify the pentaerythritol with said monocarboxylic acid and dehydrate the pentaerythritol partial ester formed thereby obtaining a partially esterified dipentaerythritol-containing pentaerythritol reaction product and water, the total amount of water present including 1 mole of water of esterification per mole of acid and from 0.4 to 0.8 mole of water of dehydration per mole of pentaerythritol.

4. The method of producing pentaerythritol reaction products which comprises the steps of forming a mixture comprising pentaerythritol, an acid dehydration catalyst, and from 1 to 2 moles of a monocarboxylic acid per mole of pentaerythritol, said monocarboxylic acid being selected from the group consisting of fatty acids containing 6 to 18 carbon atoms, benzoic acid, and mixtures thereof, and heating said mixture at a temperature between approximately 150° C. and 230° C. to substantially simultaneously esterify the pentaerythritol with said monocarboxylic acid and dehydrate the pentaerythritol partial ester formed thereby obtaining a partially esterified dipentaerythritol-containing pentaerythritol reaction product and water, the total amount of water present including 1 mole of water of esterification per mole of acid and from 0.45 to 0.65 mole of water of dehydration per mole of pentaerythritol.

5. The method of producing pentaerythritol reaction products which comprises the steps of forming a mixture comprising pentaerythritol, an acid dehydration catalyst, and about 1.3 moles of a carboxylic acid per mole of pentaerythritol, said monocarboxylic acid being selected from the group consisting of fatty acids containing 6 to 18 carbon atoms, benzoic acid, and mixtures thereof, and heating said mixture at a temperature between approximately 150° C. and 230° C. to substantially simultaneously esterify the pentaerythritol with said monocarboxylic acid and dehydrate the pentaerythritol partial ester formed thereby obtaining a partially esterified pentaerythritol reaction product containing at least 10% of partially esterified dipentaerythritol and water, the total amount of water present including 1 mole of water of esterification per mole of acid and from 0.4 to 0.8 mole of water of dehydration per mole of pentaerythritol.

6. The method of producing pentaerythritol reaction products which comprises the steps of heating and partially esterifying pentaerythritol with from 1 to 2 moles per mole of pentaerythritol of a monocarboxylic acid selected from the group consisting of fatty acids containing 6 to 18 carbon atoms, benzoic acid, and mixtures thereof at a temperature between approximately 150° C. and 230° C. thereby forming and removing 1 mole of water of esterification per mole of acid and thereafter heating and dehydrating at a temperature between approximately 150° C. and 230° C. in the presence of an acid dehydration catalyst the partially esterified pentaerythritol to remove from 0.45 to 0.65 mole of water of dehydration per mole of pentaerythritol thereby forming a partially esterified pentaerythritol reaction product containing at least 10% of partially esterified dipentaerythritol.

7. In the process of producing alkyd resins, the steps comprising heating and partially esterifying pentaerythritol with 1 to 2 moles per mole of pentaerythritol of a monocarboxylic acid selected from the group consisting of fatty acids containing 6 to 18 carbon atoms, benzoic acid, and mixtures thereof at a temperature between approximately 150° C. and 230° C. to form 1 mole of water of esterification per mole of acid, heating and dehydrating the partially esterified pentaerythritol at a temperature between approximately 150° C. and 230° C. in the presence of an acid dehydration catalyst to form from 0.4 to 0.8 mole of water of dehydration per mole of pentaerythritol thereby forming a partially esterified dipentaerythritol-containing reaction product, and thereafter heating said partially esterified reaction product at a temperature between approximately 220° C. and 230° C. with an acid selected from the group consisting of maleic acid, fumaric acid, succinic acid, sebacic acid, adipic acid, phthalic acid, terephthalic acid, isophthalic acid, tetrahydrophthalic acid, hexahydrophthalic acid, and the anhydrides of said acids, said acid being present in an amount that is substantially equivalent stoichiometrically to the amount of said partially esterified pentaerythritol reaction product that is present, thereby forming an alkyd resin.

8. In the process of producing alkyd resins, the steps comprising heating and partially esterifying pentaerythritol with 1.3 moles per mole of pentaerythritol of a monocarboxylic acid selected from the group consisting of fatty acids containing 6 to 18 carbon atoms, benzoic acid, and mixtures thereof at a temperature between approximately 150° C. and 230° C. to form 1 mole of water of esterification per mole of acid, heating and dehydrating the partially esterified pentaerythritol at a temperature between approximately 150° C. and 230° C. in the presence of an acid dehydration catalyst to form from 0.45 to 0.65 mole of water of dehydration per mole of pentaerythritol thereby forming a partially esterified dipentaerythritol-containing pentaerythritol reaction product, and thereafter heating said partially esterified reaction product at a temperature between approximately 220° C. and 230° C. with an acid selected from the group consisting of maleic acid, fumaric acid, succinic acid, sebacic acid, adipic acid, phthalic acid, terephthalic acid, isophthalic acid, tetrahydrophthalic acid, hexahydrophthalic acid, and the anhydrides of said acids, said acid being present in an amount that is substantially equivalent stoichiometrically to the amount of said partially esterified pentaerythritol reaction product, thereby forming an alkyd resin.

9. In the process of producing alkyd resins, the steps comprising heating and partially esterifying pentaerythritol with 1 to 2 moles per mole of pentaerythritol of fatty acids of oil having drying properties at a temperature between approximately 150° C. and 230° C. to form 1 mole of water of esterification per mole of acid, heating and dehydrating the partially esterified pentaerythritol at a temperature between approximately 150° C. and 230° C. in the presence of an acid dehydration catalyst to form from 0.4 to 0.8 mole of water of dehydration per mole of pentaerythritol thereby forming a partially esterified, dipentaerythritol-containing pentaerythritol reaction product, and thereafter heating said partially esterified reaction product at a temperature between approximately 220° C. and 230° C. with phthalic anhydride, said phthalic anhydride being present in an amount that is substantially equivalent stoichiometrically to the amount of said partially esterified pentaerythritol reaction product that is present, thereby forming an alkyd resin.

10. In the process of producing alkyd resins, the steps comprising heating and partially esterifying pentaerythritol with about 1.3 moles per mole of pentaerythritol of soybean oil fatty acids at a temperature between approximately 150° C. and 230° C. to form 1 mole of water of esterification per mole of pentaerythritol, heating and dehydrating the partially esterified pentaerythritol at a temperature between approximately 150° C. and 230° C. in the presence of a catalytic amount of p-toluenesulfonic acid to form from 0.4 to 0.8 mole of water of dehydration per mole of pentaerythritol thereby forming a partially esterified dipentaerythritol-containing pentaerythritol reaction product, and thereafter heating said partially esterified reaction product at a temperature between approximately 220° C. and 230° C. with phthalic anhydride being present in an amount that is substantially equivalent stoichiometrically to the amount of said partially esterified reaction product that is present, thereby forming an alkyd resin.

References Cited in the file of this patent
UNITED STATES PATENTS

| | | |
|---|---|---|
| 2,182,397 | Eckey | Dec. 5, 1939 |
| 2,315,708 | Hovey et al. | Apr. 6, 1943 |
| 2,345,528 | Bradley | Mar. 28, 1944 |
| 2,409,332 | Woodruff | Oct. 15, 1946 |
| 2,627,508 | Lum | Feb. 3, 1953 |